Dec. 18, 1951          R. E. HIATT          2,579,233
POSITION INDICATOR FOR VEHICLE STEERING APPARATUS
Filed Jan. 26, 1949
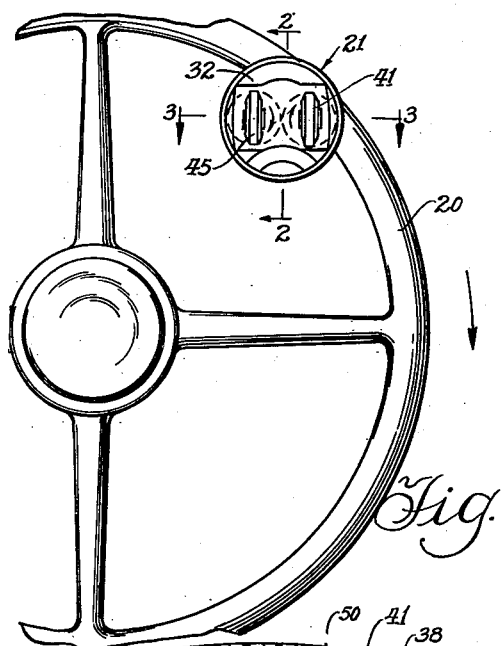
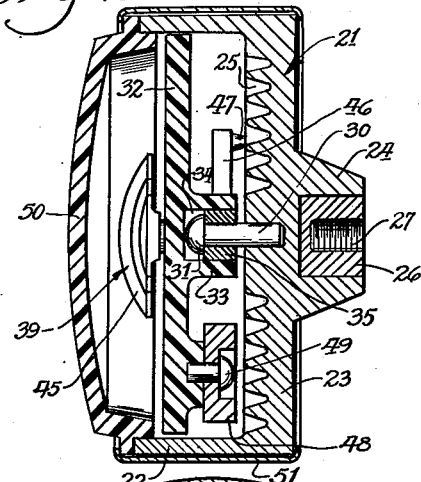
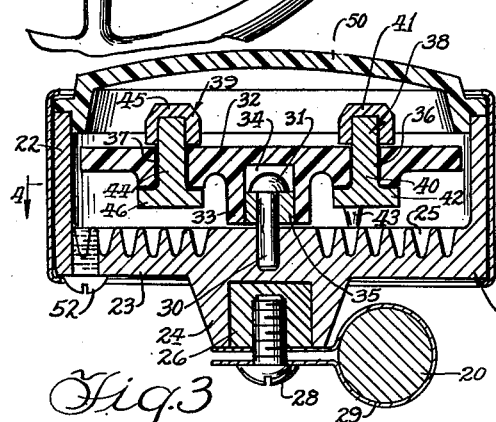
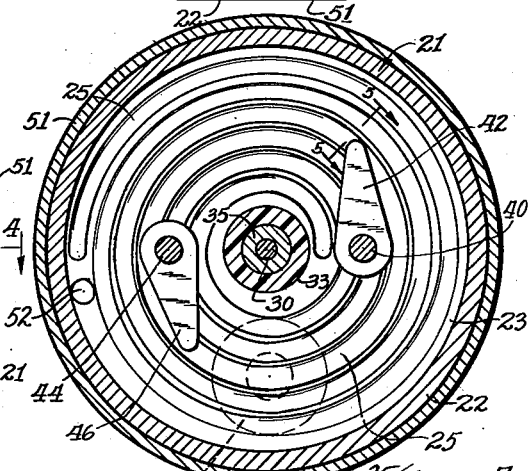
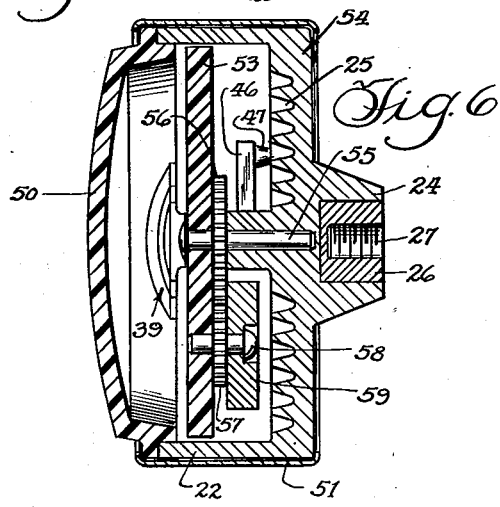
INVENTOR.
Robert E. Hiatt
BY
Kegan and Kegan
Atty's Patented Dec. 18, 1951

2,579,233

UNITED STATES PATENT OFFICE 2,579,233

POSITION INDICATOR FOR VEHICLE STEERING APPARATUS

Robert E. Hiatt, Oak Lawn, Ill.

Application January 26, 1949, Serial No. 72,951

7 Claims. (Cl. 116—31)

My invention relates to mechanism for indicating the angular position of a steerable element of a vehicle, such as for example the front wheels of an automobile, truck, or other land vehicle; the turning wheel on airplane tricycle landing gear; and the rudder of a motorboat or other water craft. More particularly, my invention relates to position indicator mechanism adapted for attachment directly to the steering wheel, lever, tiller or similar steering control element of a vehicle.

Position indicators for steerable vehicles have been proposed in a variety of forms, each having for its principal object the provision of mechanism whereby the operator of the vehicle can readily ascertain the angular position of the steerable element of the vehicle. This information is especially desirable, for example, as an aid in parking an automobile. Further, when the automobile is parked adjacent to a high curb, it is desirable to know the angular position of the front wheels before moving the automobile at all, so as to avoid scraping the side of the automobile against the curb. The main objections to these prior art devices stem from the fact that their installation usually necessitates extensive modification of conventional steering apparatus. By steering apparatus, as used in the specification and claims, I mean the steering control element and the linkage gearing or other mechanism interconnecting the control element with the steerable element. Many of these prior devices also disfigure the appearance of the steering control element, especially in the case of the steering wheels found in modern automobiles. And, in every case, these prior art mechanisms may cause jamming or locking of the steering apparatus since each is mechanically connected to and driven by the steering apparatus and thus in effect form an integral part of said apparatus.

It is an object of the present invention, therefore, to provide position indicating mechanism which may be easily attached to the steering control element of the vehicle to accurately indicate at all times the position of the steerable element, yet which requires no drive connection or mechanical coupling to the steering apparatus whatsoever.

I accomplish this useful and desirable end by utilizing the relative movement between a member secured to the movable steering control element and a freely suspended pendulum member, to obtain deflection of indicating means which accurately tracks the movement of the steerable element.

In order that my invention may be more fully disclosed, reference is had to the accompanying drawings which illustrate several forms of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a front elevational view illustrating the manner in which one embodiment of my invention may be secured to the steering control element of a vehicle;

Figure 2 is a side elevational view taken in cross-section on the line 2—2 of Figure 1;

Figure 3 is a plan elevational view taken in section on the line 3—3 of Figure 1;

Figure 4 is a fragmentary front elevational view taken in section on the line 4—4 of Figure 3, showing in detail the cam or track which is formed in the housing;

Figure 5 is a fragmentary, detailed view taken in section along the line 5—5 of Figure 4; and Figure 6 is a side elevational view, taken in vertical cross-section, of a second embodiment of my invention.

Like reference characters designate like parts in the drawings and in the description of my invention which follows hereafter.

Because there is a direct operative connection between the steering control element, as exemplified by the steering wheel 20 and the steerable element, and because the operation of my invention is dependent solely upon the movement of the steering element, for purpose of simplicity and clarity the drawings do not illustrate either the steerable element or the linkage or the like which interconnects the latter with the steering control element, but instead the drawings relate only to the position indicator mechanism and its manner of attachment and relation to the steering control element. However, it should be noted that in general, angular movement of the steering control element does not result in the same angular movement of the steerable element. Thus, for example, in the case of modern automotive practice, it is usually necessary to rotate the steering wheel through about 720 degrees to shift the front wheels from the position in which said wheels parallel the longitudinal axis of the automobile to the maximum angular inclination to either the right or the left. It therefore is impossible to indicate position of the front wheels by means of a simple indicator attached to and driven by the steering wheel, and a stationary dial attached to the steering post or other stationary portion of the automobile.

Referring now to Figure 1, one embodiment of my invention is shown secured to the rim of the steering wheel 20 so as to turn with said steering wheel 20. As best shown in Figures 2 and 3, this embodiment includes a cylindrical, cup-shaped housing 21, which comprises a side wall portion 22, a platform or bottom portion 23, and a hub portion 24. A continuous spiral-shaped groove or track 25 is formed in the platform portion 23 (Figures 4 and 5). The hub portion 24 is provided with an insert 26 including a tapped hole 27 adapted to receive the fastener 28, whereby the housing 21 is secured to the steering wheel 20 by means of the spring clip 29 (Figure 3).

Projecting from the platform portion 23 at or about the origin of the spiral-shaped track 25, is a shaft 30 provided with a head or shoulder portion 31. In the embodiment shown, it is essential that the central, longitudinal axis of the shaft 30 be inclined from the vertical when attached to the steering wheel 20; otherwise said embodiment will not function properly. In practice, however, this presents no problem, since vehicle steering control elements are conventionally inclined from the vertical and do not lie in a horizontal plane.

A dial face 32 is rotatably mounted upon the shaft 30 and includes a hub portion 33, having a recess 34 into which the sleeve bushing 35 is inserted. Said bushing 35 journals the shaft 30, while the interior end surface of the bushing 35 acts as a thrust bearing surface for the shoulder portion 31 of the shaft 30. The dial face 32 is further characterized by a pair of openings 36 and 37 substantially parallel to the shaft 30 (Figure 3). Indicator assemblies 38 and 39 are journaled by said openings 36 and 37, respectively. The indicator assembly 38 comprises a shaft portion 40, an indicator 41 which is positioned on the upper surface of the dial face 32, a crank portion 42, positioned on the under side of the dial face 32, and a pin 43 which engages the track 25 (Figure 5). Similarly, the indicator assembly 39 comprises a shaft portion 44, an indicator 45, crank portion 46, and a pin 47 which engages the track 25.

Also carried by the dial face 32, at a point proximate the periphery of said face, is a weight 48, affixed to said dial face by the pin 49.

As best shown in Figures 2 and 3, the housing 21 is provided with a cover or lens 50 of transparent material. An outer ring 51 is placed about the housing 21, and is adapted to rotate relative to the housing 21; accordingly, besides serving as a position indicator, the embodiment of Figures 1-5 may be utilized as a grasping member of the type popularly designated by the term "spinner knob."

In use, the housing 21 is secured to the steering wheel 20, as indicated, and rotates therewith. As the operator turns the steering wheel 20, and thereby turns the housing 21 about the center of rotation of the steering wheel 20, the dial face 32 does not deflect, but remains stationary with respect to the vehicle, due to the pendulum effect of the weight 48 on said dial face. That is to say, the weight 48 acts to shift the center of gravity of the dial face 32 to a position spaced from the center of rotation of said dial face 32, and thus the dial face 32 acts as a freely suspended pendulum with the weight 48 remaining in vertical alignment with the shaft 30. Consequently, the dial face 32 and the platform portion 23 turn relative to one another as the steering wheel 20 revolves. As the dial face 32 and the portion 23 turn relative to each other, the pins 43 and 47, eccentric of the shaft portions 40 and 44, are restrained to follow along the spiral-shaped track 25 and turn the shaft portions 40 and 44, respectively. As shown in Figures 1 and 4, as the steering wheel 20 is turned in a clockwise direction, the shaft portion 40 turns in a clockwise direction, while the shaft portion 44 also turns in a clockwise direction. Therefore, since the indicators 41 and 45 turn with their respective shaft portions 40 and 44, said indicators rotate in the same direction as the steerable element of the vehicle. Thus, by selecting the proper pitch for the track 25, indicators 41 and 45 may be made to accurately track the movement of the steerable element of the vehicle. For example, when my invention is adapted for use with an automobile, the indicators 41 and 45 show the angular position of the front wheels of the automobile.

Under certain conditions of use, the components of the embodiment of Figures 1-5 may be subjected to extreme acceleration forces, which, if unchecked, may cause "throw over" of the dial face 32, i. e., the dial face 32 will be revolved about the shaft 30 one or more times. Such extreme acceleration forces occur, for example, when the direction in which the housing 21 is moving is suddenly reversed, as when the steering wheel 20 is first caused to move rapidly in one direction and then suddenly stopped and moved in the opposite direction. Thus, for example, when the position indicator is placed on the rim of the steering wheel of an automobile, and the motorist, in making a sharp, rapid turn, allows the steering wheel to spin back rapidly of its own volition in coming out of the turn, the acceleration forces referred to are brought into play. These forces may, of course, be reduced by moving the device toward the center of the steering wheel; however, it is the intent of this invention to permit placing the position indicator mechanism at any point on the steering wheel. To prevent "throw over" under such conditions, I prefer to provide damping means which resist sudden movement of the movable portions of my invention. In the case of the embodiment of Figures 1-5, damping is preferably accomplished by one of the following methods: (1) filling the entire cavity of the housing 21 with a damping fluid; (2) filling the recess 34 with a damping fluid of higher viscosity; or (3) lubricating the shaft 30 with a high viscosity damping fluid. In practice, I find that silicone damping fluids work very effectively, since the viscosity of such fluids remains substantially constant over a very wide temperature range. In the event that the damping fluid is to fill the cavity of the housing 21, then the lens 50 should of course be fastened to the housing 21 so as to form a liquid tight seal. To fill the cavity of the housing 21 with damping fluid, I provide a filler plug 52 (Figure 3).

Figure 6 illustrates a second embodiment of my invention in which mechanical damping means are utilized to prevent "throw over." It will be noted that the embodiment of Figure 6 has many elements in common with that of Figures 1–5, while the method used to convert the motion of the housing 54 into a deflection as the indicators 41 and 45 which indicate the position of the steerable element is identical to that of the embodiment of Figures 1–5. The major point of difference between these two embodiments lies in the manner in which the dial face 53 is rotatably secured to the housing 54. As shown in Figure 6, a shaft 55 extends from the housing 54 in a manner similar to that of the shaft 30 of Figure 2. The dial face 53 is free to rotate on the shaft 55, while the gear 56 is fixed to said shaft. The gear 56 meshes with a planetary gear 57 which is rotatably mounted upon the countershaft 58 affixed to the dial face 53. A weight 59 is also journaled upon the countershaft 58 and turns with the planetary gear 57.

Accordingly, when the steering wheel 20 is turned, thereby causing the housing 54 to rotate relative to the dial face 53, the gear 56 causes the planetary gear 57 to rotate. As in the case of the embodiment of Figures 1–5, the weight 59 acts to hold the dial face 53 fixed with respect to the vehicle as the wheel 20 revolves. As long as the steering wheel 20 moves at normal speeds, there is no requirement for any damping action, and the net effect of the apparatus of Figure 6, under these conditions, is to cause the weight 59 to rotate slowly as the housing 54 turns with the steering wheel 20.

In the event, however, that the direction of movement of the housing 54 is suddenly reversed, thereby imposing acceleration forces of large magnitude upon the dial face 53, the mechanical damping mechanism shown acts to effectively damp out such forces. The forces suddenly applied to the dial face 53, and which act to rotate the dial face 53 relative to the shaft 55 (and hence the gear 56), necessarily are transmitted to the planetary gear 57. The weight 59 is drivably connected to the gear 57, however, and because of the inherent inertia of said weight 59, this sudden application of a turning force or torque to the gear 57 generates an opposing force resisting any rotation of the weight 59. Consequently, a large proportion of the acceleration forces which may otherwise cause "throw over," is effectively neutralized. As a result, the possibility of "throw over" is eliminated, and the most serious effect that a sudden change in the direction of movement of the housing 54 can have upon the position indicator mechanism is to cause a temporary fluctuation in the movements of the indicators 41 and 45.

Accordingly, each of the embodiments shown in Figures 1–6 may be secured to the rim portion of a steering wheel 20 in a position which is readily observable by the operator. Because of the means used to secure the mechanism to the steering wheel 20, it is unnecessary to modify or change in any respect either the steering control element or the steering apparatus of which the element forms a part. And, by using one of the dampening mediums described above, any possibility of "throw over" is eliminated.

Advantageously, each embodiment of my invention shown in the drawings may be inexpensively manufactured and will provide trouble-free service over a long period of time. Many parts of the two embodiments of Figures 1–6, as for example the housings 21 and 54, may be conveniently molded from a variety of plastics. In either case, the embodiment requires no direct mechanical connection with the steering apparatus of the vehicle, thereby overcoming the main objections to the prior art devices.

While I have shown and described certain embodiments of my invention, it is to be understood that these embodiments have been given by way of example only and that various changes and rearrangements of the details shown herein may be made without departing from the spirit of the invention, the scope of which is defined in the appended claims.

I claim:

1. Index mechanism adapted for use with steerable vehicles having a steering wheel which is inclined from the horizontal, and wheels the respective axes of which may be shifted by turning said steering wheel, comprising: a member, means securing said member to said steering wheel, said member having an upper surface which is substantially parallel to the plane of said steering wheel when secured thereto, said upper surface having a spiral-shaped track therein, a shaft member projecting from said member at approximately the origin of said track, the axis of said shaft being substantially perpendicular to said upper surface of said member, a dial on said shaft rotatable relative to said member, a weight on said dial eccentric of said shaft, whereby said dial is held against turning, a pair of indicator shafts journaled in said dial and in substantially parallel alignment with said shaft member, a pair of indicators secured to said indicator shafts, respectively, and positioned on the side of said dial which faces away from said steering wheel, and a pair of crank members extending from said indicator shafts, respectively, adjacent to said spiral-shaped track, each of said crank members including a pin eccentric of its associated indicator shaft and engageable with said track to follow the convolutions thereof.

2. Index mechanism for indicating the relative angular position of an element which is mounted for rotation, said mechanism comprising: a first member, a shaft member projecting from said first member, cam means on said first member having a substantially spiral configuration, said shaft member positioned approximately at the origin of said spiral means for securing said first member to said element to incline said shaft member from the vertical, a second member rotatable on said shaft member, the center of gravity of said second member spaced from the axis of rotation thereof, an indicator journaled in said second member, and a cam follower drivably connected to said indicator and drivably engaged with said cam means.

3. A front wheel position indicator for motor vehicles adapted to be secured to the steering control element thereof, comprising in combination: a first member, means for removably securing said first member to said control element with a face of said first member inclined from the horizontal, spiral generating cam means in said face of said first member, a shaft member projecting from said first member substantially perpendicular to said face, whereby said shaft member is inclined from the vertical when said first member is secured to said control element, a second member rotatable on said shaft member, the center of gravity of said second member being spaced from the axis of rotation thereof, an indicator journaled in said second member, and a cam follower drivably connected to said indicator and drivably engaged with said spiral generating cam means.

4. Front wheel position indicating apparatus for use with a motor vehicle having a steering wheel inclined from the horizontal and front wheels the respective axes of which are shifted by rotation of said steering wheel, comprising: a substantially cylindrical, cup-shaped housing having a spiral-shaped track in the bottom thereof, means for removably securing said housing to said steering wheel to position the plane of said track substantially parallel to the plane of said steering wheel, a main shaft projecting perpendicularly from said bottom of said housing at the origin of said spiral-shaped track, whereby said shaft is inclined from the vertical when said housing is secured to said steering wheel, a circular member rotatably mounted at the center thereof on said shaft, a pendulum weight affixed to said circular member adjacent the periphery thereof, a transparent cover for said housing, a pair of indicator shafts journaled in said circular member and in substantially parallel alignment with each other and with said first mentioned shaft, a pair of indicators secured to said indicator shafts, respectively, and positioned on that side of said circular member which faces said transparent cover, said indicators being movable on said shafts, relative to said circular member, a pair of cranks extending from said indicator shafts, respectively, adjacent to said spiral-shaped track, each of said cranks including a pin eccentric of its associated indicator shaft and engageable with said track to follow the convolutions thereof, and damping fluid within said housing surrounding and damping the movement of said circular member and said elements carried thereby.

5. Index mechanism adapted for use with steerable vehicles including a control element, and a steerable element the line of action of which may be shifted by moving said control element, comprising: a platform adapted to be secured to said control element with the plane of said platform inclined from the horizontal, said platform having a substantially spiral-shaped track therein, a circular member having a recessed hub portion, a sleeve bearing in said hub portion, a shaft projecting from said platform at substantially right angles thereto and positioned at substantially the center of said spiral-shaped track, said sleeve bearing being journaled on the projecting end portion of said shaft, a thrust bearing on said shaft adapted to contact the interior end surface of said sleeve bearing, a weight on said circular member eccentric of said shaft, and indicator means rotatably supported by said circular member, said indicator means including a crank member having an eccentric end portion, said end portion being engageable with said track to follow the spiral convolutions thereof.

6. For use with a steerable vehicle including a steering wheel which is inclined from the horizontal, an index mechanism comprising: a platform adapted to be secured to said steering wheel and having a substantially spiral-shaped groove therein, a first shaft projecting from said platform at substantially right angles thereto and positioned at the center of said groove, whereby said first shaft is inclined from the vertical when said platform is secured to said steering wheel, a first gear fixed to said first shaft, a circular member turnable on said first shaft, a second shaft projecting from said circular member eccentric of said first shaft, a weight rotatable on said second shaft, a second gear secured to said weight and engaged with said first gear, a pair of indicator shafts journaled in said circular member and in substantially parallel alignment with each other and with said first mentioned shaft, a pair of indicators secured to said indicator shafts, respectively, and positioned on that side of said circular member which faces away from said groove, and a pair of cranks extending from said indicator shafts, respectively, adjacent to said spiral-shaped groove, each of said cranks including a pin eccentric of its associated indicator shaft and engageable with said groove, to follow the convolutions thereof.

7. Index mechanism adapted for use with steerable vehicles having a steering control element, and at least one steerable element the line of action of which may be shifted by moving said control element, comprising: a platform adapted to be secured to said control element with a surface thereof inclined from the horizontal, said surface having a substantially spiral-shaped track therein, a first shaft projecting from said platform at substantially right angles thereto, whereby said shaft is inclined from the vertical when said platform is secured to said steering element, first gear means carried by said first shaft, a circular member turnable on said first shaft, a second shaft projecting from said circular member eccentric of said first shaft, an assembly rotatable on said second shaft including a weight portion and second gear means, said first and second gear means in mesh with each other, and indicator means rotatably supported by said circular member, said indicator means including a crank member the eccentric end portion of which is engageable with said track.

ROBERT E. HIATT.

REFERENCES CITED

The following references are of record in the file of this patent:

UNITED STATES PATENTS

| Number | Name | Date |
|---|---|---|
| 2,104,521 | Jackson et al. | Jan. 4, 1938 |
| 2,282,189 | Jackson | May 5, 1942 |